(12) United States Patent
Bierhuizen et al.

(10) Patent No.: US 6,505,939 B1
(45) Date of Patent: Jan. 14, 2003

(54) PROJECTION SYSTEM COMPRISING AT LEAST TWO LIGHT SOURCES HAVING A UNIQUE OPTICAL ARRANGEMENT WITH RESPECT TO AT LEAST ONE SPATIAL LIGHT MODULATOR

(75) Inventors: Serge Joel Armand Bierhuizen, Wilsonville, OR (US); Marten Sikkens, Eindhoven (NL); Anthonie Hendrik Bergman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/552,653

(22) Filed: Apr. 19, 2000

(30) Foreign Application Priority Data

Apr. 23, 1999 (EP) .............................................. 99201283

(51) Int. Cl.⁷ ...................... G03B 21/26; G03B 21/28; G03B 26/00; G03B 5/08; G02F 1/00
(52) U.S. Cl. ............................. 353/94; 353/20; 353/99; 353/84; 353/88; 353/89; 353/30; 359/290; 359/291; 359/298; 359/318; 359/855; 359/872; 348/771; 348/755; 385/901
(58) Field of Search ............................. 353/94, 30, 31, 353/88, 89, 29, 37, 33, 69, 81, 102, 98, 99, 20, 84; 349/8, 9, 5, 6, 7; 359/290, 291, 298, 318, 855, 872; 348/771, 755; 385/901

(56) References Cited

U.S. PATENT DOCUMENTS

| 5,633,755 A | * | 5/1997 | Manabe et al. ............. 359/443 |
| 5,796,526 A | * | 8/1998 | Anderson ................... 359/671 |
| 6,224,216 B1 | * | 5/2001 | Parker et al. ................. 353/31 |
| 6,252,636 B1 | * | 6/2001 | Bartlett ........................ 348/743 |

FOREIGN PATENT DOCUMENTS

EP          0740178        10/1996 ........... G02B/19/00

* cited by examiner

Primary Examiner—Russell Adams
Assistant Examiner—Melissa Koval

(57) ABSTRACT

Projection system comprising at least two light sources, a projection lens and a spatial light modulator located between the light sources and the projection lens, which light modulator comprises a plurality of light-deflection devices each provided with an element which is tiltable about a tilt axis. The light sources are arranged with respect to the spatial light modulator in such a way that, in operation, the centers of the light beams coming from the light sources and projected on each element are located on a projection line which extends substantially parallel to the tilt axis of the element.

20 Claims, 5 Drawing Sheets

PROJECTION SYSTEM COMPRISING AT LEAST TWO LIGHT SOURCES HAVING A UNIQUE OPTICAL ARRANGEMENT WITH RESPECT TO AT LEAST ONE SPATIAL LIGHT MODULATOR

FIELD OF TECHNOLOGY

The invention relates to a projection system comprising at least two light sources, a projection lens and at least a spatial light modulator located between the light sources and the projection lens, said light modulator comprising a plurality of light-deflection devices each provided with an element which is tiltable about a tilt axis, the tilt axes extending parallel to each other.

BACKGROUND AND SUMMARY

A spatial light modulator is understood to mean an analog or digital mirror device (such as TMA or DMD), as well as an eidophor whose reflective properties can be changed, and other light modulators with which the direction of a light beam can be changed.

In such a projection system, which is known from European patent application EP-A2-0 740 178, a spatial light modulator is illuminated by means of two light sources. The spatial light modulator comprises a plurality of light-deflection devices each provided with an element which is tiltable about a tilt axis. Each element is separately tiltable from a position directing light towards the projection lens to a position directing light away from the projection lens, and vice versa. A condenser lens directing the light from the light source to a first optical axis is associated with each light source. The projection system is further provided with a cylindrical lens which is located on the first optical axis, which lens receives the light from each condenser lens. The light subsequently passes through an exit condenser lens, whereafter it is directed onto the spatial light modulator.

A drawback of this known projection system is that the tilt directions of the individual elements of the spatial light modulator are not taken into account when positioning the light sources, so that there is a risk that no optimal light output is obtained.

It is an object of the invention to provide a projection system which may comprise a plurality of light sources, while an optimal light output is obtained.

This object is achieved in the projection system according to the invention in that the light sources are arranged with respect to the spatial light modulator in such a way that, in operation, the centers of the light beams coming from the light sources and projected on each element are located on a projection line which extends substantially parallel to the tilt axis of the element.

Since the light spots coming from the light source are located on a connection line extending parallel to the tilt axis, the light coming from all light sources will enter the element and will be deflected in the same direction when tilting an element.

These and other aspects of the invention are apparent from and will be elucidated with reference to the embodiments described hereinafter.

BRIEF DESCRIPTION OF THE DRAWINGS

Corresponding components in the Figures are denoted by the same reference numerals.

DETAILED DESCRIPTION OF THE PREFERRED EMBODIMENTS

Figure 1:
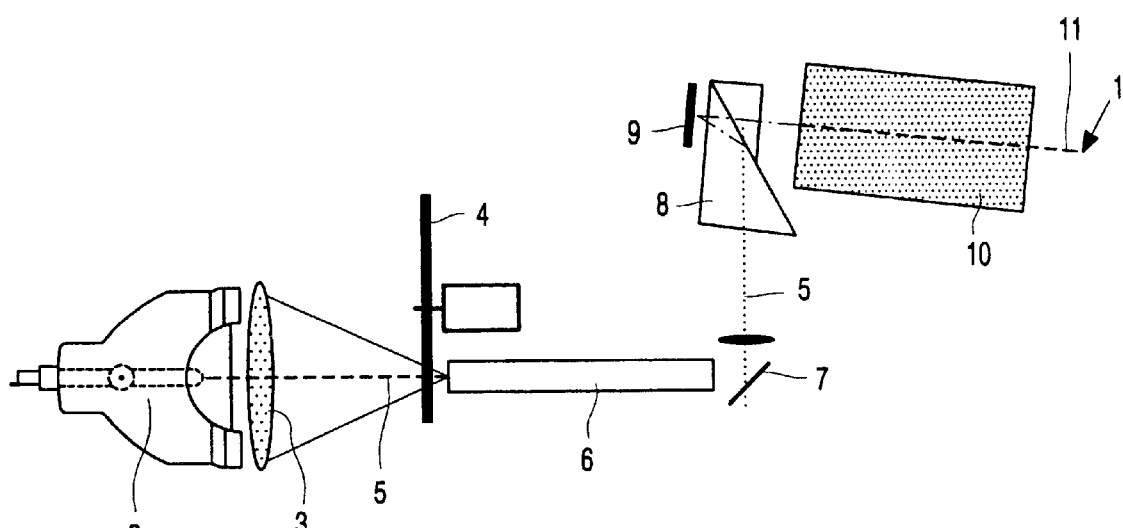
FIG. 1 shows a projection system comprising a single light source.

FIG. 1 shows a known projection system 1 which comprises a light source 2, a lens 3 for receiving light from the light source, a rotatable color filter 4 following the lens 3, an integrator bar 6 located in the optical light path 5 of the light source 2, a deflection mirror 7 located on a side of the integrator bar 6 remote from the light source, a total internal reflection (TIR) prism 8 located in the optical light path 5, a spatial light modulator comprising a digital mirror device (DMD) 9 located proximate to the TIR prism 8, and a projection lens 10 located on another side of the TIR prism. The light path 5 further extends as an imaging light path 11 from the DMD 9.

Figure 2:
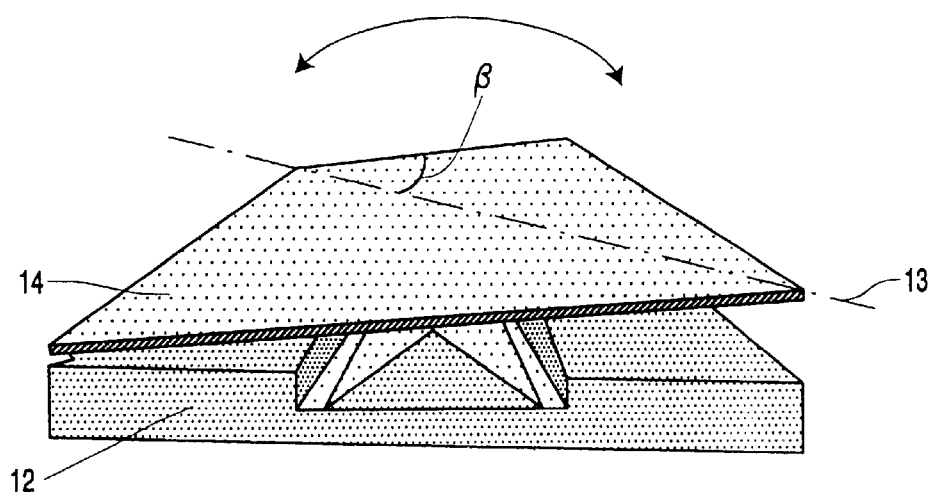
FIG. 2 shows an element of a spatial light modulator.

FIG. 2 shows a digital light-deflection device 12 provided with an element 14 which is tiltable about a tilt axis 13. The element 14 is tiltable between two rest states. Such digital light-deflection devices are known per se, as is apparent, inter alia, from the European patent application EP-A2-0 740 178 mentioned in the opening paragraph, and will therefore not be further elucidated. The currently commercially available digital light-deflection devices 12 are provided with rectangular elements 14 which are tiltable about a tilt axis 13 extending parallel to the diagonal of the rectangular element 14.

Figure 3:
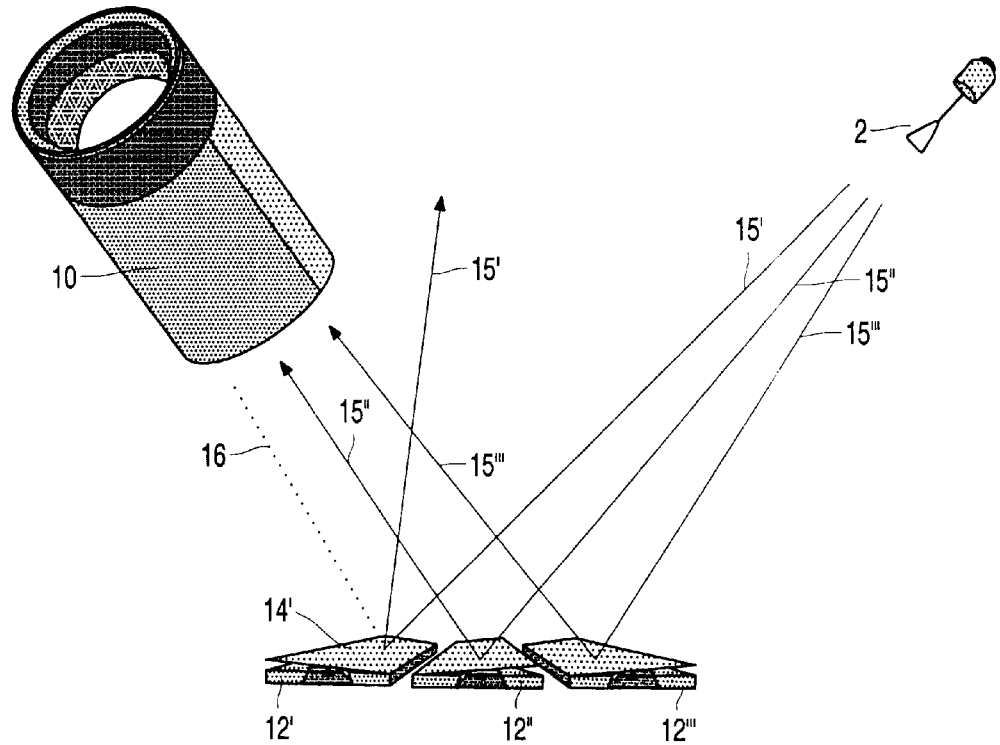
FIG. 3 shows the operation of a spatial light modulator.

FIG. 3 shows diagrammatically the operation of a number of digital light-deflection devices 12', 12" and 12'" which are illuminated by a light source 2 and with which light can be directed towards a projection lens 10. The light-deflection devices 12' and 12'" are tilted in such a way that light beams 15' and 15'" coming from the light source 2 are deflected towards the projection lens 10. The element 14' of the light-deflection device 12' is, however, tilted in such a way that the light beam 15' coming from the light source 2 is deflected away from the projection lens 10. If the element 14' were tilted in the same direction as that of the juxtaposed light-deflection devices 12' and 12'", the light beam 15' would also be directed towards the projection lens 10 in the direction 16 denoted by broken lines.

Figure 4:
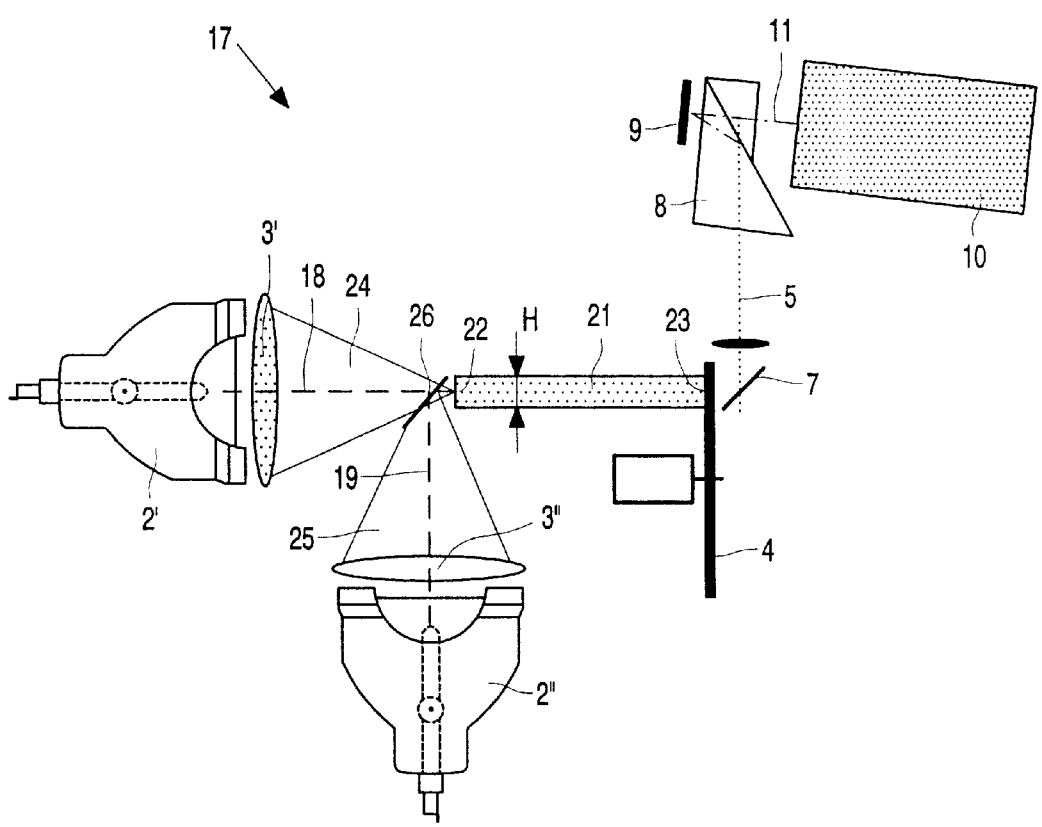
FIG. 4 is a plan view of a first embodiment of a projection system according to the invention.
Figure 5:
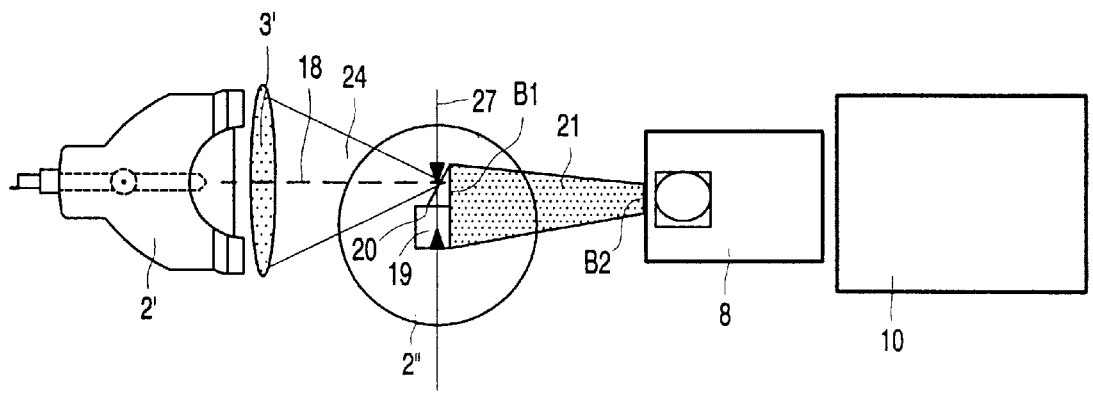
FIG. 5 is a side elevation of the projection system shown in FIG. 4.

FIGS. 4 and 5 are a plan view and a side elevation, respectively, of a first embodiment of a projection system 17 according to the invention, which is provided with two light sources 2', 2" for respectively directing light through lenses 3', 3". The optical axes 18, 19 of the light source 2', 2" are directed perpendicularly to each other, as is clearly apparent from FIG. 4. As is clearly apparent from FIG. 5, the optical axes 18, 19 cross each other at a distance 20. The projection system 17 is provided with an integrator bar 21 having an entrance side 22 and an exit side 23. Proximate to the entrance side 22, light beams 24, 25 coming from the light source 2', 2" are coupled in next to each other. To this end, a deflection mirror 26 is arranged in the optical light path 19 of the light source 2", with which deflection mirror the light beam 25 is deflected in a direction extending parallel to the light beam 24. The integrator bar 21 has a height H and a width B1 proximate to the entrance side and a height H and a width B2 proximate to the exit side 23. The ratio H:B1 is, for example, 7:4, while the ratio H:B2 is 3:4. Due to the substantially double width B1 with respect to the width B2 proximate to the exit side, the light beams coming from the light sources 2', 2" are coupled in next to each other in the integrator bar 21.

The projection system 17 further comprises a color filter 4, a deflection mirror 7, a TIR prism 8, a DMD 9 and a projection lens 10. To optimize the coupling-in of both light beams in the integrator bar 21, the color filter 4 is arranged proximate to the exit side 23 of the integrator bar 21 instead of proximate to the entrance side 22, as in the system of FIG. 1.

The light beams coming from the light sources 2', 2" are incident on the elements 14 of the light-deflection devices 12 via the optical path 5. The light sources 2', 2" are arranged in such a way that the centers of the light spots on each element 14 are located on a projection line which coincides with the tilt axis 13 of the relevant element 14. In other words, the light sources 2', 2" are arranged in such a way with respect to the tilt axes 13 of the elements 14 that the shortest connection line 27 between the optical axes 18, 19 of the light sources 2', 2", projected on each element 14, extends parallel to the tilt axis of the relevant element 14. Since the elements 14 perform only a small tilt of approximately 10°, an optimal output of the two light sources 2', 2" will be ensured in this way.

Figure 6:
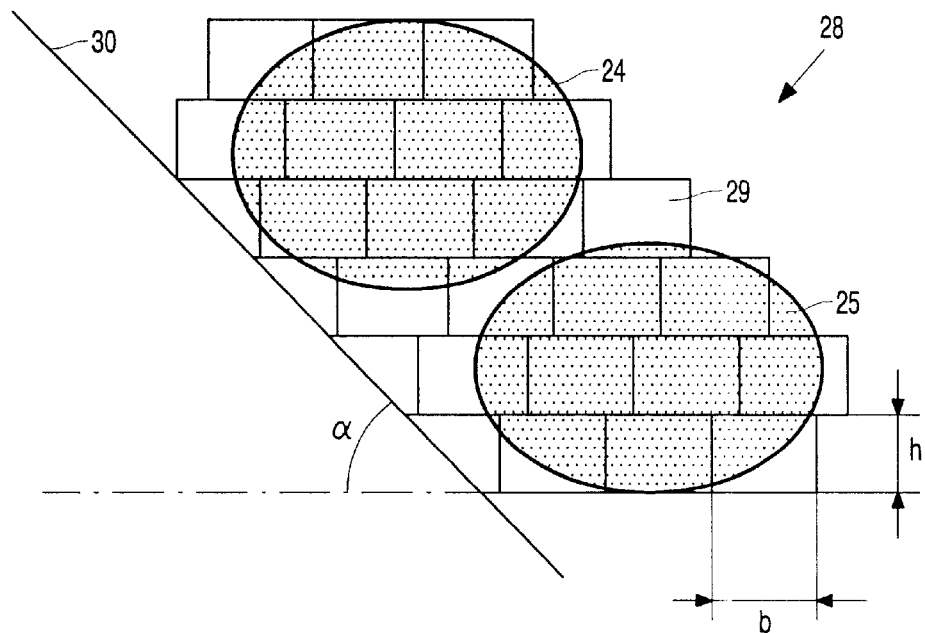
FIG. 6 shows an integrator plate of a second embodiment of a projection system according to the invention.

FIG. 6 shows an integrator plate 28 which may be used in a second embodiment of a projection system according to the invention. This projection system corresponds to the projection system shown in FIGS. 4 and 5, in which the integrator bar 21 is replaced by a first integrator plate 28 which is imaged on the DMD 9 by a second integrator plate arranged behind the first integrator plate. The second integrator plate may be identical to the first integrator plate or may be optimized for the light sources. The integrator plate 28 has a parallelepiped outer circumference and is provided with a plurality of rectangular integrator lens elements 29. The ratio between the height h and the width b of each lens element 29 corresponds to the height/width ratio of the DMD 9. The integrator plate 28 is arranged in front of the light sources 2', 2" in such a way that the light beam 24 coming from the light source 2' illuminates a left upper corner of the integrator plate 28, while the light beam 25 coming from the light source 2" illuminates the right lower corner of the integrator plate 28. In practice, the boundaries of each light beam 24, 25 are less sharply defined. The centers M of the light beams 24, 25 are located on a connection line L which extends parallel to a longitudinal side 30 of the parallelepiped integrator plate 28. The longitudinal side 30 of the integrator plate 28 encloses an angle $\alpha$ of approximately 45° with the sides of the elements 29. The angle a corresponds to the angle $\beta$ enclosed by the tilt axis 13 with the sides of the square element 14.

Figure 7:
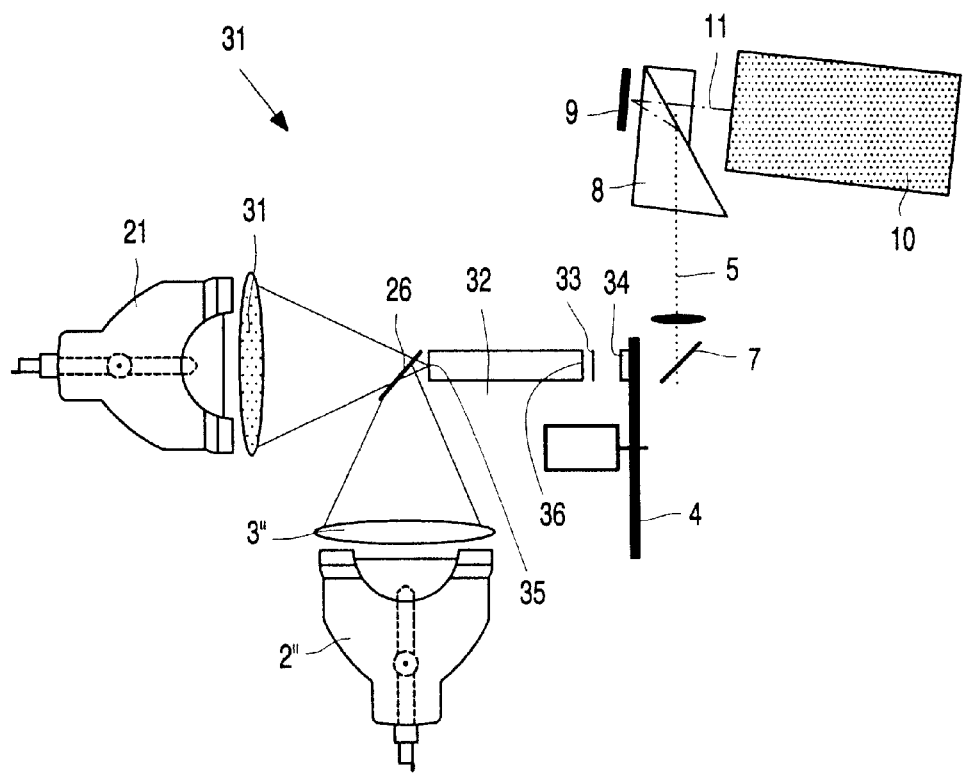
FIG. 7 shows a third embodiment of a projection system according to the invention.
Figure 8A:
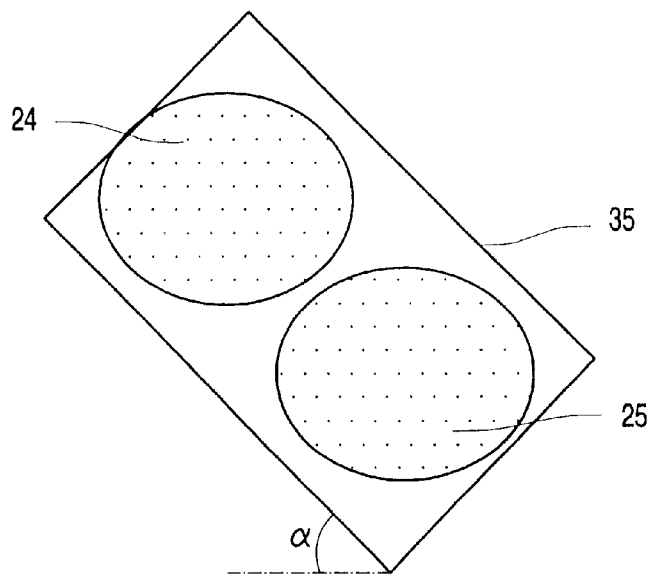
FIGS. 8A and 8B show an entrance side and an exit side of an integrator bar of the projection system shown in FIG. 7.
Figure 8B:
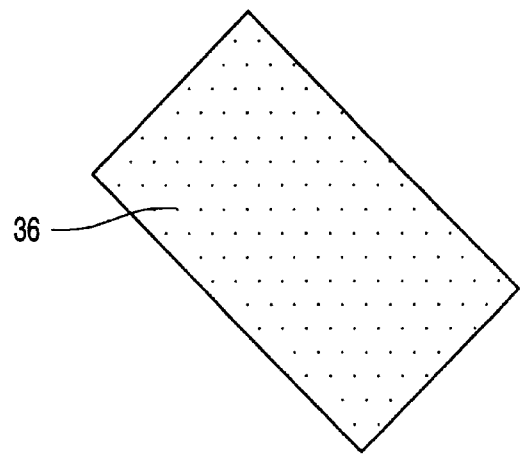
Figure 9:
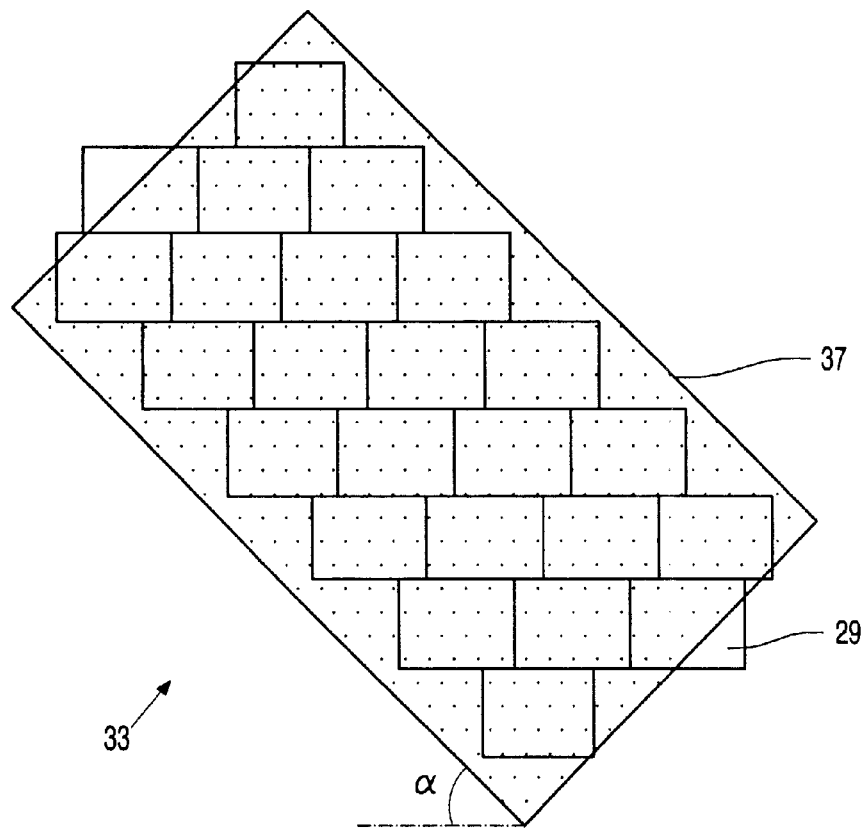
FIG. 9 shows an integrator plate of the projection system shown in FIG. 7.

FIGS. 7–9 show a third embodiment of a projection system 31 according to the invention, which differs from the projection system 17 shown in FIGS. 4, 5 in that an integrator bar 32 is provided instead of the integrator bar 21 and integrator plates 33, 34 are arranged proximate to the exit side of the integrator bar 32. The integrator bar 32 is rectangular proximate to the entrance side 35 (see FIG. 8A), with the light beams 24, 25 from the light sources 2', 2", being incident next to each other on the entrance side 35. With respect to the entering light beams 24, the integrator bar 32 encloses an angle $\alpha$ of 45°. The integrator bar 32 is also rectangular proximate to the exit side 36. An integrator plate 33 corresponding to the integrator plate 28 is located proximate to the exit side 36, which integrator plate 33 receives the rectangular light beam 37 from the integrator bar 32. Due to the different integrator lens elements 29, the light beam 37 is even further homogenized. The light beam 37 encloses an angle $\alpha$ of 45° with the sides of the integrator lens elements 29. As already described with reference to FIG. 6, the light beams 24, 25 coming from the light source 2', 2" will thereby be located next to each other on the tilt axes 13 of the elements 14. When using both an integrator bar and integrator plates, the number of lens elements located on the integrator plate may be relatively small.

The angle $\beta$ may be larger or smaller than 45° in other spatial light modulators.

What is claimed is:

1. A projection system comprising:
    at least two light sources having respective first and second optical axes;
    a projection lens; and
    at least a spatial light modulator located between the light sources and the projection lens,
    said light modulator comprising a plurality of light-deflection devices each provided with an element which is tiltable about a tilt axis, the tilt axes extending parallel to each other,
    characterized in that the light sources are arranged with respect to the spatial light modulator in such a way that, in operation, the centers of the light beams coming from the light sources and projected on each element are located on a projection line which extends substantially parallel to the tilt axis of the element.

2. A projection system as claimed in claim 1, characterized in that the first and second optical axes cross each other, while the shortest connection line between the optical axes, projected on each element of the spatial light modulator, coincides with the projection line of the relevant element.

3. A projection system as claimed in claim 1, wherein an integrator system is arranged between the light sources and the spatial light modulator.

4. A projection system as claimed in claim 3, characterized in that the integrator system comprises an integrator bar having an entrance side proximate to the light sources and a rectangular exit side proximate to the spatial light modulator.

5. A projection system as claimed in claim 4, characterized in that the ratio between the height and width of the rectangular exit side corresponds to the height/width ratio of the spatial light modulator.

6. A projection system as claimed in claim 4, wherein the ratio between the height and width of the rectangular exit side is approximately 7:4 proximate to the entrance side and approximately 4:3 proximate to the exit side.

7. A projection system as claimed in claim 3, wherein the integrator system comprises at least an integrator plate which is provided with a plurality of rectangular lens elements, a longitudinal side bounding the integrator plate enclosing an angle with the rectangular lens elements, which angle is substantially equal to the angle between the tilt axes and a longitudinal side of the spatial light modulator.

8. A projection system as claimed in claim 3, wherein the integrator system comprises an integrator bar and at least an integrator plate, the integrator bar being located between the light sources and the integrator plate.

9. The projection system of claim 5, wherein the integrator system comprises an integrator bar and at least an integrator plate, the integrator bar being located between the light sources and the integrator plate.

10. The projection system of claim 4, wherein the integrator system comprises at least an integrator plate provided with a plurality of rectangular lens elements, a longitudinal side bounding the integrator plate enclosing an angle with the rectangular lens elements, which angle is substantially equal to the angle between the tilt axes and a longitudinal side of the spatial light modulator.

11. The projection system of claim 2, wherein an integrator system is arranged between the light sources and the spatial light modulator.

12. The projection system of claim 11, wherein the integrator system comprises an integrator bar having an entrance side proximate to the light sources and a rectangular exit side proximate to the spatial light modulator.

13. The projection system of claim 12, wherein the ratio between the height and width of the rectangular exit side corresponds to the height/width ratio of the spatial light modulator.

14. The projection system of claim 12, wherein the ratio between the height and width of the rectangular exit side is approximately 7:4 proximate to the entrance side and approximately 4:3 proximate to the exit side.

15. The projection system of claim 11, wherein the integrator system comprises at least an integrator plate provided with a plurality of rectangular lens elements, a longitudinal side bounding the integrator plate enclosing an angle with the rectangular lens elements, which angle is substantially equal to the angle between the tilt axes and a longitudinal side of the spatial light modulator.

16. The projection system of claim 15, wherein the integrator system comprises an integrator bar and at least an integrator plate, the integrator bar being located between the light sources and the integrator plate.

17. The projection system of claim 14, wherein the integrator system comprises an integrator bar and at least an integrator plate, the integrator bar being located between the light sources and the integrator plate.

18. The projection system of claim 13, wherein the integrator system comprises an integrator bar and at least an integrator plate, the integrator bar being located between the light sources and the integrator plate.

19. The projection system of claim 12, wherein the integrator system comprises an integrator bar and at least an integrator plate, the integrator bar being located between the light sources and the integrator plate.

20. The projection system of claim 11, wherein the integrator system comprises at least an integrator plate which is provided with a plurality of rectangular lens elements, a longitudinal side bounding the integrator plate enclosing an angle with the rectangular lens elements, which angle is substantially equal to the angle between the tilt axes and a longitudinal side of the spatial light modulator.

* * * * *